(12) United States Patent
Neighbor et al.

(10) Patent No.: US 12,087,017 B2
(45) Date of Patent: Sep. 10, 2024

(54) CAMERA CALIBRATION OPTIMIZATION USING IMAGE SEGMENTATION AND BOOM RESOLVERS FOR AUTOMATED AIR-TO-AIR REFUELING

(71) Applicant: The Boeing Company, Arlington, VA (US)

(72) Inventors: Joshua Neighbor, Seattle, WA (US); Shawn M. Chamberlain, Federal Way, WA (US); Luis-Alberto J. Santiago, Edmonds, WA (US)

(73) Assignee: The Boeing Company, Arlington, VA (US)

( * ) Notice: Subject to any disclaimer, the term of this patent is extended or adjusted under 35 U.S.C. 154(b) by 78 days.

(21) Appl. No.: 18/157,341

(22) Filed: Jan. 20, 2023

(65) Prior Publication Data
US 2024/0249437 A1    Jul. 25, 2024

(51) Int. Cl.
*G06T 7/80*      (2017.01)
*B64D 39/00*    (2006.01)
*B64D 43/00*    (2006.01)
*B64D 47/08*    (2006.01)
*G06T 7/136*    (2017.01)
*G06T 7/194*    (2017.01)

(52) U.S. Cl.
CPC ............ *G06T 7/80* (2017.01); *B64D 39/00* (2013.01); *B64D 43/00* (2013.01); *B64D 47/08* (2013.01); *G06T 7/136* (2017.01); *G06T 7/194* (2017.01)

(58) Field of Classification Search
CPC ........ B64D 39/00; B64D 39/06; B64D 47/08; B64D 39/04; B64D 39/02; B64D 43/00; B64D 45/0005; B64D 3/00; G06T 7/80; G06T 7/136; G06T 7/194

USPC ......................................................... 348/144
See application file for complete search history.

(56) References Cited

U.S. PATENT DOCUMENTS

2008/0250423 A1   10/2008   Bush et al.
2011/0025853 A1   2/2011   Richardson
(Continued)

OTHER PUBLICATIONS

Paulson et al.( Paulson Z, Nykl S, Pecarina J, Woolley B. Mitigating the effects of boom occlusion on automated aerial refueling through shadow volumes. The Journal of Defense Modeling and Simulation. 2019; 16(2): 175-189. doi: 10.1177/1548512918808408) (Year: 2019).*

*Primary Examiner* — Christopher S Kelley
*Assistant Examiner* — Ana Picon-Feliciano
(74) *Attorney, Agent, or Firm* — Quinn IP Law

(57) ABSTRACT

A system for calibrating a camera for use aboard a fuel-supplying aircraft ("tanker") for an automated air-to-air refueling ("A3R") process in which the tanker offloads aviation fuel to a fuel-receiving aircraft ("receiver") includes an electronic control unit having a processor and a non-transitory computer-readable storage medium on which is recorded instructions for calibrating the camera. Executing the instructions causes the processor to perform a corresponding method, i.e., to receive boom position data indicative a true position of the boom in free space, and real-time image data from the camera. The instructions also cause the processor to use the boom position data and a 3D model of the boom to project a digital representation of the boom into the image space. The processor then minimizes a difference between the projected and real images of the boom to thereby calibrate the camera.

20 Claims, 4 Drawing Sheets

(56) References Cited

U.S. PATENT DOCUMENTS

2019/0344902 A1* 11/2019 Cramblitt ................ G06T 17/20
2021/0380271 A1* 12/2021 Tillotson .................. G06T 7/97
2023/0215041 A1    7/2023 Nguyen et al.

* cited by examiner

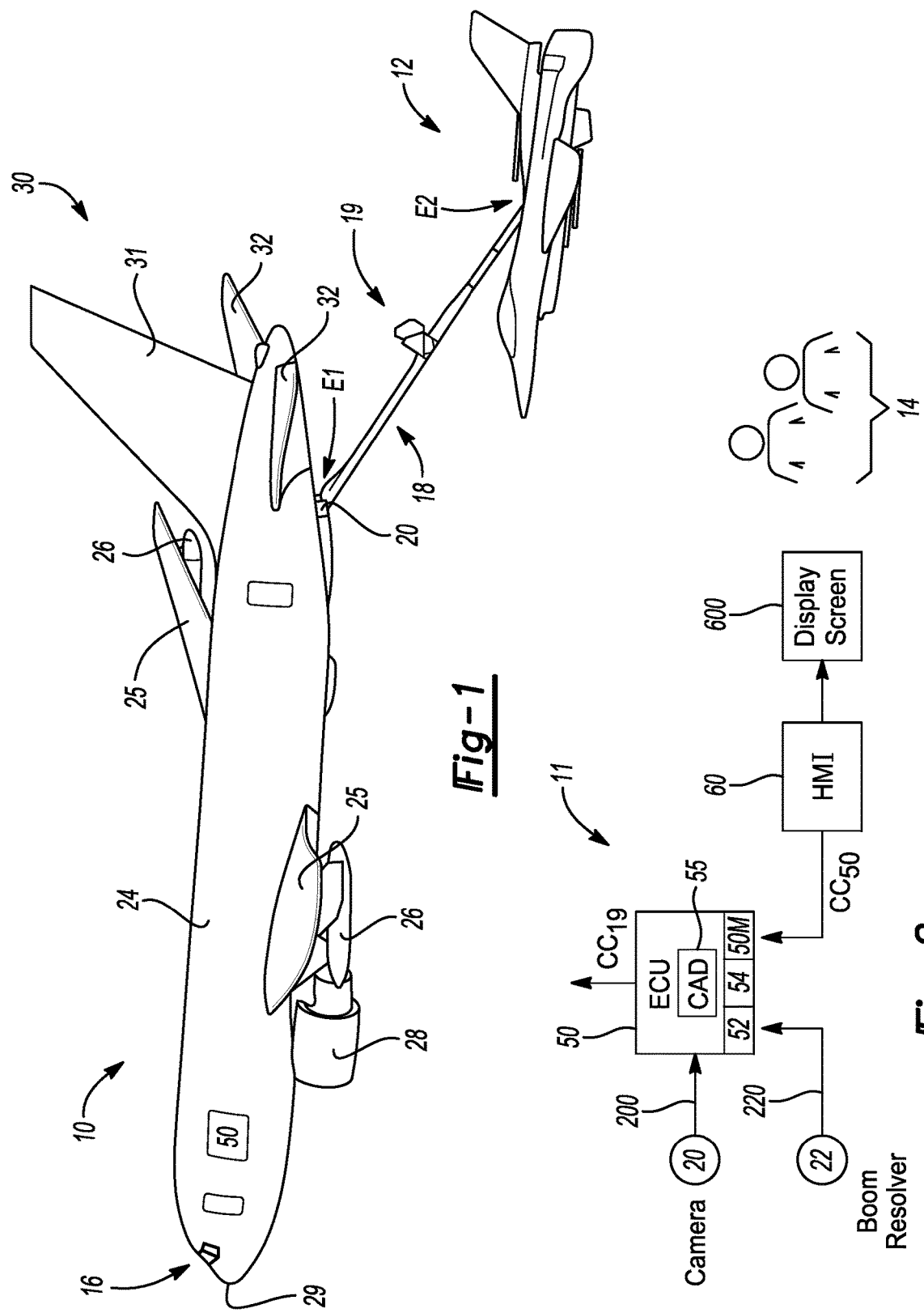

CAMERA CALIBRATION OPTIMIZATION USING IMAGE SEGMENTATION AND BOOM RESOLVERS FOR AUTOMATED AIR-TO-AIR REFUELING

BACKGROUND

During an automated air-to-air refueling ("A3R") process, aviation fuel is transferred from a fuel-supplying aircraft ("tanker") to a fuel-receiving aircraft ("receiver") while the tanker and the receiver fly together in close formation. Air-to-air refueling allows the receiver to remain airborne for extended periods of time and increase its flight range relative to traditional ground-based refueling processes.

Boom refueling in particular involves the offloading of aviation fuel from the tanker to the receiver via an intervening refueling boom. The refueling boom acts as a fuel conduit for transferring aviation fuel from one or more fuel tanks carried by or located aboard the tanker. The refueling boom as contemplated herein is controlled by-wire using control inputs from more human boom operators situated at a forward position aboard the tanker. The boom operators are assisted in visualizing the refueling boom and the receiver by a live video feed from one or more tanker-mounted cameras. The boom operators are thus able to view real-time digital image data of the refueling boom and the receiver on high-resolution display screens rather than directly through a window of the tanker when monitoring the ongoing refueling process.

SUMMARY

The present disclosure relates to systems and methods for calibrating a camera of a fuel-supplying aircraft ("tanker") having a refueling boom configured to offload aviation fuel to a fuel-receiving aircraft ("receiver"). The terms "calibration" and "calibrating" as used herein entail determining an optimized boom-to-camera ("bTc") relationship. As appreciated in the art, camera calibration has two components: 1) camera intrinsics, such as the distortion caused by a lens, focal point, field of view, etc., and 2) camera extrinsics, such as where the camera is located in a reference frame. The teachings described herein pertain to the latter, i.e., camera extrinsics, which in the present solution amounts to ascertaining the above-noted bTc relationship, or in other words, where the camera is in relation to the boom.

As represented herein, the camera is configured to visualize a refueling boom and the receiver in a three-dimensional ("3D") airspace during an automated air-to-air refueling ("A3R") process. Two-dimensional ("2D") image data from the tanker-mounted camera is ultimately used by one or more boom operators aboard the tanker to visualize the refueling boom and the receiver in the 3D airspace.

An aspect of the disclosure includes a system for calibrating a camera for use aboard a tanker during an A3R process. The system may include a processor and a non-transitory computer-readable storage medium or memory on which is recorded a 3D model of a refueling boom and instructions for calibrating the camera. The 3D model includes a digital representation of the refueling boom. Execution of the recorded instructions by the processor causes the processor to receive boom position data from a boom resolver or another suitably configured boom position sensor, with the boom position data being indicative of a true position of the refueling boom in free space.

Execution of the instructions also causes the processor to receive real-time image data of the refueling boom from the camera in an image space of the camera as a real image, and to project the digital representation of the refueling boom into the image space as a projected image. This occurs using the boom position data and a boom-to-camera ("bTc") relationship. Additionally, the processor is causes to iteratively calculate an optimized value of the bTc relationship until a difference or position error between a position of the real image and a position of the projected image is minimized in the image space. The system is therefore able to calibrate the camera by determining the optimized value of the bTc relationship.

Also disclosed herein is a method for calibrating a camera for use in an A3R process. An embodiment of the method includes receiving real-time image data from a camera as a real image, via an electronic control unit ("ECU") aboard a tanker having a refueling boom. The real image includes 2D image frames of a receiver and the refueling boom in an image space of the camera. The method includes receiving, via the ECU from a boom resolver, boom position data indicative of a true position of the refueling boom in free space.

The method in this embodiment also includes projecting a digital representation of the refueling boom from a 3D model thereof into the image space. The projected digital representation is thus a "projected image" as applied herein, and is determined using the boom position data and a bTc relationship. The method includes iteratively calculating an optimized value of the bTc relationship until a difference between a position of the real image and a position of the projected image is minimized in the image space. The method in the embodiment thus calibrates the camera by determining the optimized value of the bTc relationship.

Another aspect of the disclosure includes a tanker having a fuselage, a refueling boom, a camera, and a camera calibration system. The fuselage is configured to transport a supply of aviation fuel. The camera, which is connected to the tanker, includes one or more rearward-facing monocular cameras configured to output real-time image data of the refueling boom and the receiver in an image space of the camera. The camera calibration system for an A3R process includes a boom resolver configured to measure a true position of the refueling boom in free space, and to output boom position data indicative of the true position of the refueling boom.

The camera calibration system also includes an ECU in communication with the camera and the boom resolver. The ECU is programmed with a 3D model of the refueling boom and is configured to receive the boom position data and the real-time image data from the boom resolver and the camera, respectively, wherein the real-time image data as a real image of the boom resolver. The ECU then projects a digital representation of the refueling boom from the 3D model into the image space as a projected image using the boom position data and a bTc relationship. Additionally, the ECU iteratively calculate an optimized value of the bTc relationship until a difference between a position of the real image and a position of the projected image is minimized in the image space. In this manner, the camera calibration system is able to calibrate the camera by determining the optimized value of the bTc relationship.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

BRIEF DESCRIPTION OF THE DRAWINGS

FIG. 1 illustrates a representative automated air-to-air refueling ("A3R") process during which a fuel-supplying aircraft ("tanker") delivers aviation fuel to a fuel-receiving aircraft ("receiver") while the tanker and receiver fly in close formation.

FIG. 2 is a schematic illustration of a representative A3R camera calibration system in accordance with an aspect of the disclosure.

Figure 1A:
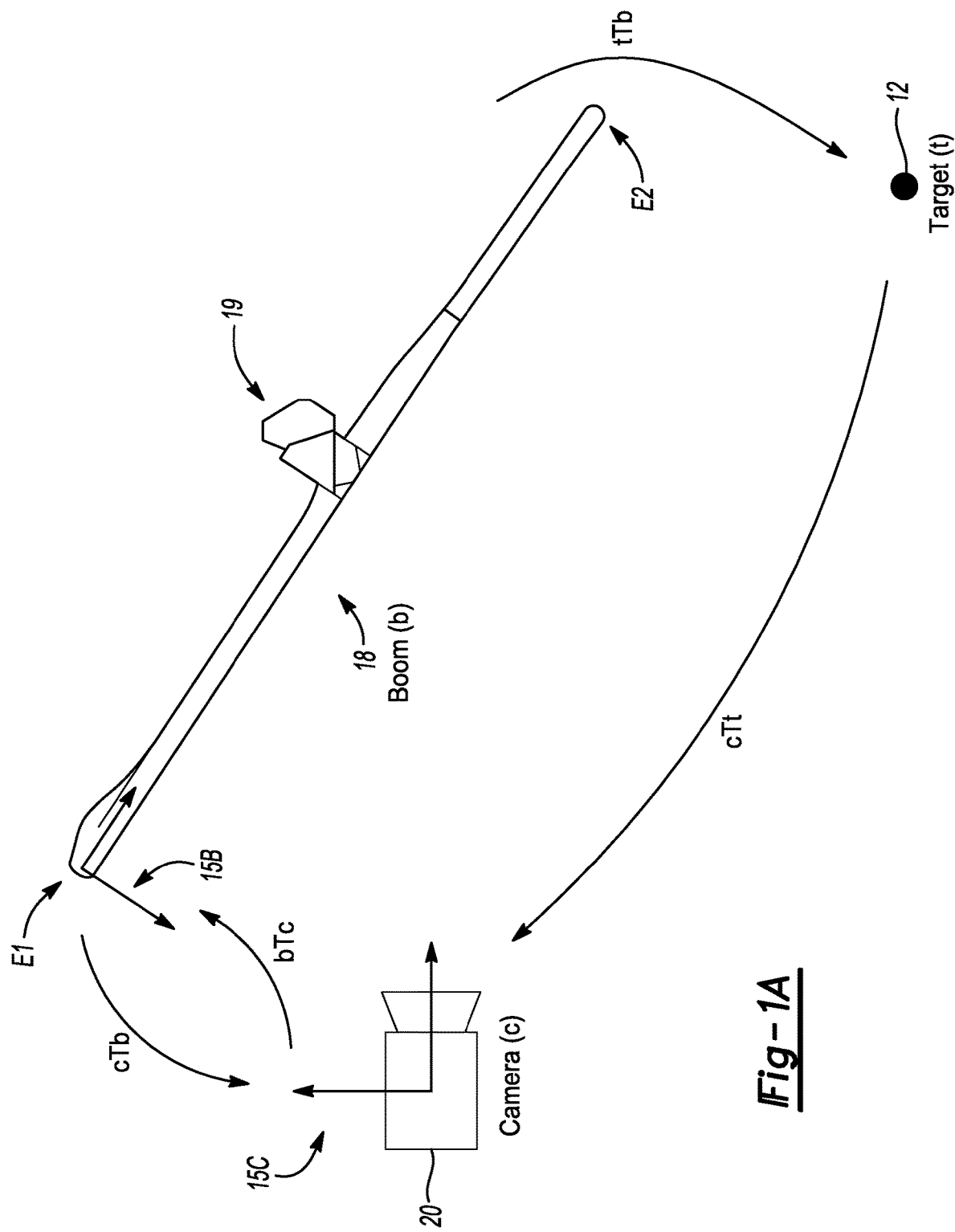
FIG. 1A illustrates relative positions of a camera, target, and refueling boom.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. The disclosed embodiments are illustrative examples, and thus other embodiments can take various and alternative forms. The Figures are not necessarily to scale and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the drawings, wherein like reference numbers refer to the same or like components in the several Figures, a fuel-supplying aircraft ("tanker") 10 and a fuel-receiving aircraft ("receiver") 12 are shown in FIG. 1 while engaged in an aerial refueling operation. Boom operators 14 (see FIG. 2), i.e., human personnel trained to perform the disclosed aerial refueling tasks, are situated within the tanker 10, such as in proximity to a cockpit 16 thereof. The boom operators 14 of FIG. 2 control operation of a refueling boom 18 by-wire during the aerial refueling operation with the assistance of one or more cameras 20. Such cameras 20 are typically mounted to the tanker 10 in proximity to the refueling boom 18, e.g., at or near a terminal end E1 of the refueling boom 18. A tip E2 of the refueling boom 18 is disposed opposite the terminal end E1, with the tip E2 being equipped with a fuel delivery nozzle (not shown) configured to engage a receptacle 21 (see FIG. 3) of the receiver 12.

Referring briefly to FIG. 1A, as appreciated by those skilled in the art, a camera's optical frame of reference ("image space") differs from that of an imaged target in three-dimensional ("3D") free space, with the target in accordance with the present disclosure being the receiver 12 and the subject camera being the camera 20. Thus, any error in an image-collecting camera's true position will emerge as error in the imaged target's position. Calibration of the camera (c) 20 is thus achieved by determining an optimized value of a boom-to-camera ("bTc") relationship. Using current algorithms, one is able to ascertain a camera-to-target positional relationship ("cTt") of an imaging target (t) in terms of the coordinate system or image space 15C of the camera 20. To close the control loop when refueling the receiver 12 using the refueling boom (b) 18, the refueling boom 18 must first be moved to the target (t), which in this exemplary case is the receiver 12, or more precisely its receptacle 21. This control action requires accurate knowledge of the target-to-boom position (tTb), i.e., the positional relationship of the target relative to the refueling boom 18.

To make the required positional translation, it is necessary to ascertain how the coordinate system 15B of the refueling boom 18 in free space is related to the coordinate system 15C of the camera 20, i.e., the boom-to-camera relationship (bTc). Error in this defined boom-to-camera positional relationship (bTc) will be propagated as position error in the target-to-boom position (tTb) when relating the imaged target (t) to the boom 18. Thus, calibration of the camera 20 as set forth herein entails solving for the camera-to-boom value (cTb), which as appreciated in the art is the inverse of the boom-to-camera relation (bTc). The bTc relationship (or its inverse, cTb) in turn minimizes any difference between "real" and "projected" images of the refueling boom 18 in the course of the present method 50M as described herein.

The present teachings are therefore intended to address the potential problem of applying computer-based solutions aboard the tanker 10 of FIG. 1 when resolving the true position of the camera 20 relative to that of the refueling boom 18 in 3D free space, i.e., the working airspace located aft of and below the tanker 10 of FIG. 1. Calibration in accordance with the disclosure can improve the overall accuracy of the A3R process when the boom operators 14 of FIG. 2 attempt to locate the receiver 12 in flight while maneuvering the tip E2 of the refueling boom 18 toward the receptacle 21.

Referring briefly to FIG. 2, a camera calibration system 11 in accordance with one or more aspects of the disclosure includes the camera(s) 20, with a single camera 20 shown for illustrative simplicity. The camera calibration system 11 also includes a boom resolver 22, an electronic control unit ("ECU") 50, and a human-machine interface ("HMI") 60 having or communicating with one or more display screens 600. The various components of the camera calibration system 11 are securely mounted to and/or positioned aboard the tanker 10 of FIG. 1, with associated image data transfer and component-to-component communication occurring wirelessly or via hardwired transfer conductors.

The camera 20 may be embodied as a rearward-facing monocular camera of an application-specific spectral capability. For example, the camera 20 of FIG. 2 may be capable of collecting the real-time image data (arrow 200) in the human-visible/red-green-blue spectral range, or using near-infrared, infrared, or other portions of the electromagnetic spectrum, e.g., under heavy cloud cover or low-light conditions. The boom resolver 22 in turn may be configured as a boom position rotary position sensor configured to measure an angular position of the refueling boom 18 of FIG. 1 in free space, and to report the measured position to the ECU 50 as boom position data (arrow 220). The boom position data (arrow 220) from the boom resolver 22 for its part describes the position and orientation of the refueling boom 18 in free space, e.g., 25° down, zero roll, and extended 5°. This boom position data (arrow 220) is ultimately used to project a digital representation of the refueling boom 18 from a 3D model 55 of the refueling boom 18 into the 2D image space of the camera 20.

The ECU 50, which includes one or more processors 52, memory 54, and a 3D model 55, e.g., a computer-aided design ("CAD")-based digital model of the refueling boom 18 of FIG. 1, is in communication with the HMI 60 and with flight control surfaces 19 of the refueling boom 19 (see FIG. 1). As part of the present calibration strategy, the ECU 50 is operable for executing a camera calibration method 50M, a representative example of which is described below with reference to FIG. 4. As part of the method 50M, the ECU 25 applies optimization techniques to optimize the boom-to-camera (bTc) relationship of FIG. 1A, and ultimately identify a corresponding set of camera parameters, that minimizes any difference between a collected real image of the refueling boom 18 and a projected image of the refueling boom 18 as set forth below.

Referring again to FIG. 1, the representative tanker 10 includes a fuselage 24 connected to one or more wings 25. In the illustrated configuration, the fuselage 24 may define a cargo bay with fuel tanks (not shown) configured to contain and transport a supply of aviation fuel for eventual offloading to the receiver 12. Each of the wings 25 may be connected in some configurations to a refueling pod 26 and one or more engines 28, e.g., jet turbines, with the engines 28 providing thrust for propelling the tanker 10. The fuselage 24 also defines the cockpit 16 proximate a nose 29 of the tanker 10. An empennage assembly 30 is connected to the fuselage 24 diametrically opposite the nose 29, i.e., at tail end of the tanker 10, with the empennage assembly 19 in the representative construction of FIG. 1 including a vertical stabilizer 31 and horizontal stabilizers 32.

The tanker 10 of FIG. 1 is equipped to perform boom-based air-to-air refueling operations. To that end, the tanker 10 may be embodied as a structurally-modified commercial passenger or transport aircraft having a reinforced airframe suitable for securely transporting the above-noted aviation fuel (not shown) and associated fuel tanks, and equipped with mission-suitable avionics and control systems. Such modifications collectively enable the tanker 10 to transport aviation fuel to a predetermined rendezvous site with the receiver 12.

Upon reaching the rendezvous site, the tanker flies in close formation with the receiver 12, the particular configuration of which may differ from that which is depicted in FIG. 1. For example, the tanker 10 maybe used to refuel suitably-equipped alternative embodiments of the receiver 12, such as but not limited to cargo planes, other tankers, surveillance and/or reconnaissance aircraft, air traffic control aircraft, weather monitoring aircraft, etc. The depicted construction of the receiver 12 of FIG. 1 is therefore illustrative of just one possible embodiment.

The tanker 10 in some configurations could also deploy flexible drogues (not shown), with each drogue fluidly coupled to the refueling pods 26 or to the fuselage 24. The refueling boom 18 moves within the slipstream of the tanker 10 with a level of control afforded by its flight control surfaces 19. Control inputs to the flight control surfaces 19 of the refueling boom 18 are commanded by the ECU 50 as boom control signals (arrow $CC_{19}$) aboard the tanker 10. The ECU 50 in turn may be interacted with by the boom operators 14 of FIG. 2 via the HMI 60, with input signals (arrow $CC_{50}$) from the HMI 60 being used by the ECU 50 to implement control decisions of the boom operators 14 of FIG. 2. Thus, the boom operators 14 ultimately maneuver the refueling boom 18 by-wire via the intervening ECU 50 when guiding the tip E2 into the mating receptacle 21 (see FIG. 3) on the receiver 12, with the location of the receptacle 21 possibly varying with the construction of the receiver 12.

The ECU 50 of the present disclosure may be embodied as one or more computer systems configured to execute computer-readable instructions embodying the method 50M from a non-transitory, computer-readable storage medium, i.e., the memory 54. As contemplated herein, one or more of the processor(s) 52 maybe implemented as a microcontroller, one or more Application Specific Integrated Circuit(s) (ASICs), Field-Programmable Gate Array (FPGAs), electronic circuits, central processing units (CPUs), etc. The memory 54 in turn includes associated transitory and non-transitory memory/storage component(s), e.g., read only memory, programmable read only memory, solid-state memory, random access memory, optical and/or magnetic memory, etc.

Figure 4:
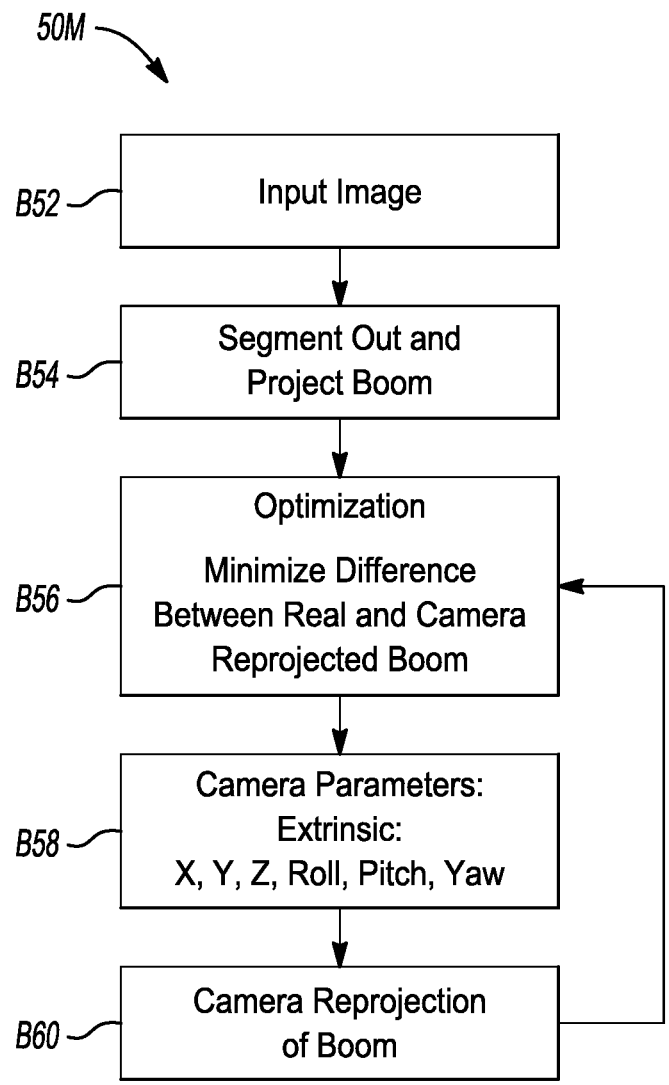
FIG. 4 is a flow chart of a method for calibrating a camera for use in an A3R process according to one or more embodiments of the present disclosure.

Computer-readable instructions embodying the method 50M of FIG. 4 maybe recorded in memory 54 and executed by the processor(s) 52 when needed for calibrating the camera 20, e.g., as machine-readable code/instructions, software, and/or firmware programs. Other hardware components of the schematically-depicted ECU 50 are omitted for simplicity but are well understood in the art, such as combinational logic circuits, input/output circuits, digital and analog signal conditioning/buffer circuitry, and other hardware components that may be accessed as needed by the processor(s) 52 to provide the control functionality described herein. Execution of the described instructions causes the processor 52 to perform the function described below.

Figure 3:
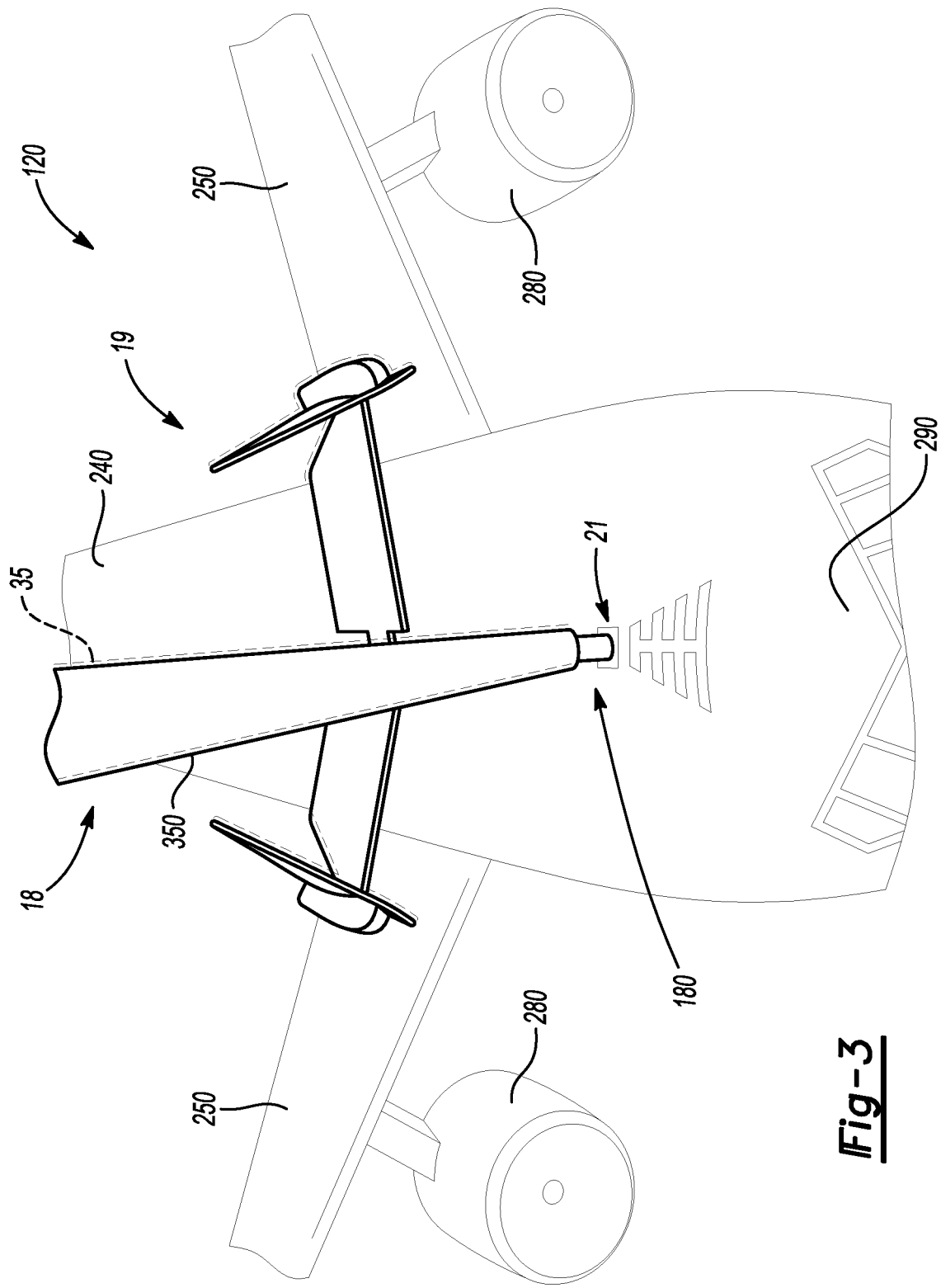
FIG. 3 is an illustration of a video image of a receiver overlaid with 3D model-projected depiction of a refueling boom of the tanker shown in FIG. 1.

Referring now to FIG. 3, a projected image of an alternatively configured receiver 120 is shown in which the receiver 120 in flight is aft of the tanker 10 of FIG. 1. In this trailing position, the refueling boom 18 extends toward the receptacle 21 and is manauvered via the flight control surfaces 19. A cockpit 290 of the receiver 120 is also partially visible in FIG. 3. An imaged boundary 35 of the refueling boom 18 in camera space is represented along with a projected model boundary 350, with the projected model boundary 350 determined by the ECU 50 in accordance with the method 50M. Ideally, performance of the method 50M minimizes or eliminates any difference between the two boundaries 35 and 350, thus ensuring precise location of the receptacle 21 and insertion therein of the tip 180 of the refueling boom 18.

In the non-limiting example scenario of FIG. 3, the receiver 120 is embodied as a cargo/transport aircraft having a fuselage 240, one or more wings 250, engines 280, and an empennage assembly (not shown). The refueling boom 18 locating the receptacle 21, which in this instance is disposed on an upper surface of the fuselage 240 proximate a cockpit 290 of the receiver 120. As the receiver 120 approaches the tanker 10 (FIG. 1), a pilot located aboard the receiver 120 of FIG. 2 minimizes relative motion between the receiver 120 and the tanker 10. This occurs while the boom operators 14 of FIG. 2 maneuver the refueling boom 18 into proper position and alignment with the receptacle 21. As described above with reference to FIG. 2, during this carefully coordinated flying maneuver, the boom operators 14 remain informed of the current position of the receiver 120 in free space by a video depiction of the receiver 120 and the refueling boom 18. This occurs via the HMI 60 and its display screen(s) 600, e.g., one or more high-resolution touch-sensitive display screens. Such information can be presented in real-time via the HMI 60, possibly with suitable graphical overlays and/or supporting textual information.

Referring to FIG. 4 in conjunction with the representative receivers 12 and 120 shown in FIGS. 1 and 2, respectively, a representative implementation of the method 50M is illustrated as a series of logic blocks for illustrative simplicity. As used herein, the term "block" refers to algorithms, code segments, sequences, or other constituent portions of the method. The individual logic blocks are implemented by the ECU 50 of FIGS. 1 and 2 when performing the method 50M in accordance with the present disclosure.

The method 50M may be performed by the ECU 50 to calibrate the camera 20, e.g., when initially installing the camera 20 of FIG. 1 and possibly periodically thereafter or subsequent to replacement or repair thereof. As described above with reference to FIG. 1A, in order for an A3R process to work properly, it is necessary to determine the position of the receiver 12, 120 relative to the refueling boom 18, since the boom operators 14 make contact between the refueling boom 18 and the receiver 12, 120 by minimizing the distance separating the tip E2 of the refueling boom 16 and the receptacle 21. Error in the understanding of a true position of the camera 20 will manifest as position error in the measured position of the receiver 12, 120 as noted above, and thus such error is to be avoided.

As appreciated in the art, existing calibration solutions typically use calibration chess boards or circular grids having predetermined geometric patterns and dimensions. Such efforts also have predetermined relative positions between the chess board/grid and the camera. These controlled conditions are used to obtain intrinsic and extrinsic values of a given camera that correct the geometric pattern captured thereby. However, such traditional approaches tend to rely on accurate position of the chess board/grid with respect to the camera, accurate production of the chess board/grid, and optimal lighting conditions. Any representation variance in the physical chess board/circular grid and/or position with respect to the camera affects the camera's intrinsic and extrinsic values, and thus reduces calibration effectiveness.

In contrast, the method 50M of FIG. 4 and embodiments thereof take a different approach to camera calibration when auto-calibrating the camera 20 of FIGS. 1, 1A, and 2. As a result, the method 50M may be characterized by an absence of the use of the above-noted calibration chess boards or circular calibration grids. As described above with particular reference to FIG. 2, the ECU 50 applies the boom resolver data 220, e.g., the above-mentioned example set of 25° down, zero roll, and 5° extension, to the 3D model 55 of the refueling boom 18, and then projects the result using a "best guess" or prior-iterated estimate of the boom-to-camera (bTc) relationship from FIG. 1A into the camera's image space. Optimization techniques are then used to find the bTc relationship (FIG. 1A) and the corresponding camera parameters that will minimize any difference between the real and projected images of the refueling boom 18 as viewed by the boom operators 14 aboard the tanker 10 of FIG. 1. With an ideal/perfect model of the camera 20, therefore, the ECU 50 can project the refueling boom 18 onto the real-time camera image displayed via the HMI 60 with a one-to-one pixel match.

Commencing with block B52 ("Input Images"), the method 50M includes receiving the real-time image data (arrow 200 of FIG. 2) from the camera(s) 20 of FIG. 1 via the ECU 50. The 2D digital video images contemplated herein include the constituent digital image frames of the real-time image data (arrow 200). The camera(s) 20 may include one or more rearward-facing monocular cameras as noted above. For instance, the camera(s) 20 maybe part of an aircraft-mounted vision system providing the boom operators 14 of FIG. 2 with a high-definition real-time view of the refueling boom 18 and the receiver 12, 120. Such real-time image data (arrow 200) thus allows the boom operators 14 to control motion of the boom 18 using a live/real-time image feed. The method 50M proceeds to block B54 after the ECU 50 has begun receiving the video stream (arrow 200) and the constituent 2D image frames thereof.

Block B54 ("Segment Out and Project Boom") entails using a machine learning image segmentation-based approach to segment out image pixels in 2D images relating to the refueling boom 18. When performing the method 50M the ECU 50 requires two pieces of information: (1) the boom position data (arrow 220) from the boom resolver 22, and (2) the real-time image data (arrow 200), with the boom position data (arrow 220) and image data (arrow 200) both shown in FIG. 2. Block B54 includes processing the real-time image data (arrow 200) to "segment out" image pixels of the refueling boom 18 from image pixels of the background, e.g., the receiver 12, 120. For this function, the ECU 50 may rely on application-suitable machine learning techniques or models to identify pixels in the real-time image data (arrow 200 of FIG. 2) corresponding to the refueling boom 18.

As appreciated in the art, image segmentation techniques are computer-vision processes used for object detection and recognition, as well as for image classification. As applied herein, the ECU 50 of FIGS. 1 and 2 could divide a 2D image of the refueling boom 18 into multiple image segments/super-pixels. The ECU 50 in this case could then assign a label to every image pixel in the 2D image, such that pixels having the same label share certain image characteristics such as intensity, texture, or color. Each image segment therefore corresponds to a different object or background.

Non-limiting exemplary approaches suitable for performing image segmentation in accordance with the present disclosure include thresholding or clustering. When using thresholding in particular, the ECU 50 could divide the received 2D images from the real-time image data (arrow 200 of FIG. 2) into a plurality of image segments based on, e.g., pixel intensity. Clustering for its part could involve grouping image pixels based on similar features. These or other application-suitable image segmentation techniques are used by the ECU 50 to separate objects or regions of interest in the constituent 2D images of the real-time image data (arrow 200 of FIG. 2), in particular the refueling boom 18 and the receiver 12, 120, to facilitate further analysis in subsequent blocks of the method 50M.

As part of block B54, the ECU 50 also projects the 3D model 55 into 2D image space. To do this, the ECU 50 positions the projected representation of the refueling boom 18 using the boom position data (arrow 220 of FIG. 2), i.e., the data provided by the boom resolver 22, e.g., the above example of 25° down, zero roll, and 5° extension. The ECU 50 also requires the perspective for such data. For this, the ECU 50 may use a "best guess" or prior iterated value of the boom-to-camera (bTc) relationship from FIG. 1A, e.g., a last-estimated value for bTc. Using the bTc relationship and the boom position data (arrow 220), therefore, the ECU 50 is able to project a 3D representation of the refueling boom into 2D image space. The method 50M then proceeds to block B56.

Block B56 ("Optimization" and "Minimize Difference Between Real and Camera Reprojected Boom") includes optimizing for the relevant number of unknowns to be solved for, in this case six unknowns: the 3D position of the camera 20 in camera space in terms of its Cartesian X, Y, and Z coordinates, along with pitch, yaw, and roll. Optimization as used herein and in the general art refers to the process of determining, from among a set of possible alternative solutions, a "best" solution to a particular problem, with the problem posed as an objective function. The determination of what is or is not a best solution is made by one or more computers, i.e., the ECU 50 in the present case, given a set of constraints. The solution is in the form of variables that minimize or maximize the objective function.

When applied herein, the ECU 50 seeks to minimize the objective function, e.g., 1-Dice as described below in optional embodiments using a Dice coefficient, to thereby minimize position error in displayed images of the refueling boom 18 in camera space and free space. In a possible implementation, the ECU 50 may use an Adams optimizer to search over the domain space to find the next values of bTc to use in a subsequent iteration. Other optimization algorithms include but are not limited to gradient descent, linear programming, and dynamic programming. Once determined, these solution values—the X, Y, and Z position, roll, pitch, and yaw of the camera 20 in this instance—are saved to memory 54 of the ECU 50. The method 50 then proceeds to block B58.

At block B58 ("Camera Parameters: Extrinsic: X, Y, Z, roll, pitch, yaw"), the ECU 50 of FIGS. 1 and 2 verifies how closely the collected real images of the refueling boom 18 is to the model-projected image from block B54. For this, the ECU 50 may iteratively adjust the camera parameters determined from block B54 to further optimize the boom-to-camera (bTc) value. For instance, the ECU 50 may calculate the above-noted Dice similarity coefficient. As appreciated by those of ordinary skill in the art, the Dice similarity coefficient is a measure of similarity between two data sets frequently used in computer vision processing to evaluate the performance of image segmentation and other tasks. The Dice similarity coefficient may be defined mathematically as Dice=2*|S1∩S2|/(|S1|+|S2|), where S1 and S2 are the two data sets and "∩" represents the size of the set. At the two extremes, a Dice similarity coefficient of 1 indicates that the two sets are identical, while 0 indicates that the two sets have no elements in common. Thus, the ECU 50 could seek to minimize the above-noted objection function 1—Dice, i.e., to maximize the Dice coefficient. As the Dice coefficient cannot exceed 1, the ECU 50 stives to achieve a Dice coefficient of as close to 1 as possible, e.g., about 0.9 to 1 in a possible embodiment, or above another threshold value. In lieu of the Dice coefficient, the ECU 50 could use different metrics to compare two images, for example, Intersection over Union (IoU), pixel accuracy, etc., and therefore the use of the Dice coefficient is representative of just one possible approach.

Referring once again to FIG. 3, the imaged boundary 35 and the projected model boundary 350 show a slight difference between the refueling boom 18 as depicted in the image on the HMI 60 of FIG. 2 and a digital representation of the refueling boom 18 as projected from the 3D model 55 into image space. The closer the fit between boundaries 35 and 350, the closer the above-noted Dice coefficient approaches the ideal value of 1. The ECU 50 could therefore optimize over this space, solving for the aforementioned six camera parameters that return the smallest pixel difference between the real segmented boom 18 in the image and the CAD projection boundary 350. For example, the ECU 50 could iteratively solve for the aforementioned camera parameters until the Dice similarity coefficient is greater than a predetermined threshold, e.g., about 0.9 in an exemplary embodiment, and ideally 1.

Referring again to FIG. 4, block B60 ("Camera Reprojection of Boom") includes projecting the refueling boom 18 from the 3D model 55 into the displayed image of the receiver 12, 120, e.g., as shown by the boundary 350 of FIG. 3. The method 50M then repeats blocks B54, B56, B58, and B60 in a loop to continuously minimize position error in measured/3D-projected and displayed images of the refueling boom 18.

The method 50M in one or more embodiments could be run once per flight of the tanker 10 of FIG. 1, or alternatively whenever a setup of the camera 20 changes. For example, the ECU 50 could run the method 50M when the camera 20 is first installed, when bumped, or when reconfigured in any way. Thus, execution of instructions embodying the method 50M could be used to relate the image space of the camera 20 to the real free space of refueling boom 18 for improved accuracy when monitoring and controlling an A3R process. These and other attendant benefits will be appreciated by those skilled in the art in view of the foregoing disclosure.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The following Clauses provide example configurations of a system and method for providing high-power optical amplification in accordance with the disclosure, as shown in the exemplary scenario of FIGS. 1-3 and disclosed herein.

Clause 1: A system for calibrating a camera for use aboard a fuel-supplying aircraft ("tanker") for an automated air-to-air refueling ("A3R") process, the system comprising: a processor; and a non-transitory computer-readable storage medium ("memory") on which is recorded a three-dimensional ("3D") model of a refueling boom and instructions for calibrating the camera, wherein the 3D model of the refueling boom includes a digital representation of the refueling boom, and wherein execution of the recorded instructions causes the processor to: receive boom position data from a boom resolver, the boom position data being indicative of a true position of the refueling boom in free space; receive real-time image data of the refueling boom from the camera in an image space of the camera as a real image; project the digital representation of the refueling boom into the image space as a projected image using the boom position data and a boom-to-camera ("bTc") relationship; and iteratively calculate an optimized value of the bTc relationship until a difference between a position of the real image and a position of the projected image is minimized within the image space.

Clause 2: The system of clause 1, further comprising: the camera.

Clause 3: The system of either of clauses 1 or 2, further comprising: the boom resolver.

Clause 4: The system of any of clauses 1-3, wherein the ECU is configured to automatically segment a two-dimensional ("2D") image of the refueling boom in the real image from a background image of a fuel-receiving aircraft ("receiver") using image segmentation.

Clause 5: The system of any of clauses 1-4, further comprising: a display screen in communication with the HMI, wherein the ECU is configured to display an image of the refueling boom on the display screen via the HMI using the optimized value of the bTc relationship.

Clause 6: The system of any of clauses 1-5, wherein the ECU is characterized by an absence of a calibration chess board or a circular calibration grid for calibrating the camera.

Clause 7: The system of any of clauses 1-6, wherein the ECU is configured to optimize the bTc relationship by minimizing an objective function.

Clause 8: The camera calibration system of any of clauses 1-7, wherein the ECU is configured to calculate a Dice similarity coefficient, and to iteratively calculate the optimized value of the bTc relationship until the Dice similarity coefficient is greater than about 0.9, and wherein the objective function is 1—the Dice similarity coefficient.

Clause 9: A method for calibrating a camera for use in an automated air-to-air refueling ("A3R") process, comprising: receiving real-time image data from the camera as a real image, via an electronic control unit ("ECU") located aboard a fuel-supplying aircraft ("tanker") having a refueling boom, wherein the real image includes two-dimensional ("2D") image frames of a fuel-receiving aircraft ("receiver") and the refueling boom in an image space of the camera; receiving, via the ECU from a boom resolver, boom position data indicative of a true position of the refueling boom in free space; project a digital representation of the refueling boom from a three-dimensional ("3D") model of the refueling boom into the image space as a projected image using the boom position data and a boom-to-camera ("bTc") relationship; and iteratively calculate an optimized value of the bTc relationship until a difference between a position of the real image and a position of the projected image is minimized in the image space.

Clause 10: The method of clause 9, further comprising: segmenting image pixels corresponding to the refueling boom from image pixels corresponding to the receiver using an image segmentation technique.

Clause 11: The method of clause 10, wherein segmenting the image pixels includes using at least one of thresholding or clustering as the image segmentation technique.

Clause 12: The method of any of clauses 9-11, wherein the ECU is in communication with a human-machine interface ("HMI") having a display screen, the method further comprising: displaying an image of the refueling boom on the display screen via the HMI.

Clause 13: The method of any of clauses 9-12, wherein receiving the real-time image data from the camera includes receiving the real-time image data from one or more rearward-facing monocular cameras connected adjacent to an end of the refueling boom.

Clause 14: The method of any of clauses 9-13, wherein iteratively calculating the optimized value of the bTc relationship includes minimizing an objective function.

Clause 15: The method of clause 14, further comprising: calculating a Dice similarity coefficient via the ECU; and iteratively calculating the optimized value of the bTc relationship until the Dice similarity coefficient is greater than about 0.9, wherein the objective function is 1—the Dice similarity coefficient.

Clause 16: A fuel-supplying aircraft ("tanker") comprising: a fuselage configured to transport a supply of aviation fuel; a refueling boom connected to the fuselage; a camera connected to the tanker, wherein the camera includes one or more rearward-facing monocular cameras configured to output real-time image data of the refueling boom and the receiver in an image space of the camera; and a camera calibration system for an automated air-to-air refueling ("A3R") process during which the tanker offloads the aviation fuel to a fuel-receiving aircraft ("receiver"), wherein the camera calibration system includes: a boom resolver configured to measure a true position of the refueling boom in free space, and to output boom position data indicative of the true position of the refueling boom; and an electronic control unit ("ECU") in communication with the camera and the boom resolver, wherein the ECU is programmed with a three-dimensional ("3D") model of the refueling boom and is configured to: receive the boom position data and the real-time image data from the boom resolver and the camera, respectively, wherein the real-time image data is a real image of the boom resolver and the camera; project a digital representation of the refueling boom from the 3D model into the image space as a projected image using the boom position data and a boom-to-camera ("bTc") relationship; and iteratively calculate an optimized value of the bTc relationship until a difference between a position of the real image and a position of the projected image is minimized in the image space.

Clause 17: The tanker of clause 16, wherein the ECU is configured to segment a two-dimensional ("2D") image of the refueling boom in the real image out from a 2D image of the receiver using an image segmentation technique.

Clause 18: The tanker of either of clauses 16 or 17, wherein the ECU is characterized by an absence of a calibration chess board or circular calibration grid for calibrating the camera.

Clause 19: The tanker of any of clauses 16-18, wherein the ECU is configured to iteratively calculate the optimized value of the bTc relationship by minimizing an objective function.

Clause 20: The tanker of clause 19, wherein the ECU is configured to calculate a Dice similarity coefficient, and to iteratively calculate the optimized value of the bTc relationship until the Dice similarity coefficient is greater than a predetermined threshold, and wherein the objective function is 1—the Dice similarity coefficient.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A system for calibrating a camera for use aboard a fuel-supplying aircraft ("tanker") for an automated air-to-air refueling ("A3R") process, the system comprising:

a processor; and
a non-transitory computer-readable storage medium ("memory") on which is recorded a three-dimensional ("3D") model of a refueling boom and instructions for calibrating the camera, wherein the 3D model of the refueling boom includes a digital representation of the refueling boom, and wherein execution of the recorded instructions causes the processor to:
   receive boom position data from a boom resolver, the boom position data being indicative of a true position of the refueling boom in free space;
   receive real-time image data of the refueling boom from the camera in an image space of the camera as a real image;
   project the digital representation of the refueling boom into the image space as a projected image using the boom position data and a boom-to-camera ("bTc") relationship; and
   iteratively calculate an optimized value of the bTc relationship to minimize a value of an objective function until a difference between a position of the real image and a position of the projected image is minimized within the image space to thereby calibrate the camera, including iteratively calculating the optimized value of the bTc relationship until a Dice similarity coefficient ("Dice") is greater than about 0.9, wherein the objective function is 1-Dice.

2. The system of claim 1, further comprising: the camera.

3. The system of claim 1, further comprising: the boom resolver.

4. The system of claim 1, wherein the execution of the recorded instructions causes the processor to automatically segment a two-dimensional ("2D") image of the refueling boom in the real image from a background image of a fuel-receiving aircraft ("receiver") using image segmentation.

5. The system of claim 1, further comprising:
a display screen in communication with the HMI, wherein the execution of the recorded instructions causes the processor to display an image of the refueling boom on the display screen via the HMI using the optimized value of the bTc relationship.

6. The system of claim 1, wherein the system is characterized by an absence of a calibration chess board or a circular calibration grid for calibrating the camera.

7. A method for calibrating a camera for use in an automated air-to-air refueling ("A3R") process, comprising:
   receiving real-time image data from the camera as a real image, via an electronic control unit ("ECU") located aboard a fuel-supplying aircraft ("tanker") having a refueling boom, wherein the real image includes two-dimensional ("2D") image frames of a fuel-receiving aircraft ("receiver") and the refueling boom in an image space of the camera;
   receiving, via the ECU from a boom resolver, boom position data indicative of a true position of the refueling boom in free space;
   projecting a digital representation of the refueling boom from a three-dimensional ("3D") model of the refueling boom into the image space as a projected image using the boom position data and a boom-to-camera ("bTc") relationship; and
   iteratively calculating an optimized value of the bTc relationship to minimize a value of an objective function, until a difference between a position of the real image and a position of the projected image is minimized in the image space, thereby calibrating the camera, including iteratively calculating the optimized value of the bTc relationship until a Dice similarity coefficient ("Dice") is greater than about 0.9, wherein the objective function is 1-Dice.

8. The method of claim 7, further comprising:
segmenting image pixels corresponding to the refueling boom from image pixels corresponding to the receiver using an image segmentation technique.

9. The method of claim 8, wherein segmenting the image pixels includes using at least one of thresholding or clustering as the image segmentation technique.

10. The method of claim 7, wherein the ECU is in communication with a human-machine interface ("HMI") having a display screen, the method further comprising:
displaying an image of the refueling boom on the display screen via the HMI.

11. The method of claim 7, wherein receiving the real-time image data from the camera includes receiving the real-time image data from one or more rearward-facing monocular cameras connected adjacent to an end of the refueling boom.

12. A fuel-supplying aircraft ("tanker") comprising:
   a fuselage configured to transport a supply of aviation fuel;
   a refueling boom connected to the fuselage;
   a camera connected to the tanker, wherein the camera includes one or more rearward-facing monocular cameras configured to output real-time image data of the refueling boom and the receiver in an image space of the camera; and
   a camera calibration system for an automated air-to-air refueling ("A3R") process during which the tanker offloads the aviation fuel to a fuel-receiving aircraft ("receiver"), wherein the camera calibration system includes:
      a boom resolver configured to measure a true position of the refueling boom in free space, and to output boom position data indicative of the true position of the refueling boom; and
      an electronic control unit ("ECU") in communication with the camera and the boom resolver, wherein the ECU is programmed with a three-dimensional ("3D") model of the refueling boom and is configured to:
         receive the boom position data and the real-time image data from the boom resolver and the camera, respectively, wherein the real-time image data is a real image of the boom resolver and the receiver;
         project a digital representation of the refueling boom from the 3D model into the image space as a projected image using the boom position data and a boom-to-camera ("bTc") relationship; and
         iteratively calculate an optimized value of the bTc relationship by minimizing a value of an objective function until a difference between a position of the real image and a position of the projected image is minimized in the image space, including iteratively calculating the optimized value of the bTc relationship until a Dice similarity coefficient ("Dice") is greater than about 0.9, wherein the objective function is 1-Dice, thereby calibrating the camera.

13. The tanker of claim 12, wherein the ECU is configured to segment a two-dimensional ("2D") image of the refueling boom in the real image out from a 2D image of the receiver using an image segmentation technique.

14. The tanker of claim 12, wherein the ECU is characterized by an absence of a calibration chess board or circular calibration grid for calibrating the camera.

15. The system of claim 1, wherein the camera is configured to collect the image data as two-dimensional (2D) digital video images, and wherein execution of the recorded instructions causes the processor to receive the real-time image data of the refueling boom as the 2D digital video images.

16. The system of claim 4, wherein the image segmentation includes thresholding by dividing the image data into a plurality of image segments based on pixel intensity.

17. The system of claim 4, wherein the image segmentation includes clustering by grouping image pixels in the image data based on similar features.

18. The system of claim 1, wherein execution of the recorded instructions causes the processor to iteratively calculate the optimized value of the bTc relationship by using an Adams optimizer to search over a domain space.

19. The tanker of claim 13, wherein the image segmentation technique includes thresholding by dividing the image data into a plurality of image segments based on pixel intensity.

20. The tanker of claim 13, wherein the image segmentation technique includes clustering by grouping image pixels in the image data based on similar features.

* * * * *